US009586686B2

(12) United States Patent
Asli

(10) Patent No.: US 9,586,686 B2
(45) Date of Patent: Mar. 7, 2017

(54) SIDE SUPPORT FOR AN AIRCRAFT SEAT

(71) Applicant: ZODIAC SEATS US LLC, Gainesville, TX (US)

(72) Inventor: Ali Mohiti Asli, Denton, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 91 days.

(21) Appl. No.: 14/069,497

(22) Filed: Nov. 1, 2013

(65) Prior Publication Data

US 2014/0117731 A1 May 1, 2014

Related U.S. Application Data

(60) Provisional application No. 61/721,153, filed on Nov. 1, 2012.

(51) Int. Cl.
| | |
|---|---|
| *B64D 11/06* | (2006.01) |
| *B60N 2/02* | (2006.01) |
| *B60N 2/24* | (2006.01) |
| *B60N 2/44* | (2006.01) |

(52) U.S. Cl.
CPC ............... *B64D 11/06* (2013.01); *B60N 2/02* (2013.01); *B60N 2/242* (2013.01); *B60N 2/449* (2013.01); *B64D 11/062* (2014.12); *B64D 11/0639* (2014.12); *B64D 11/0647* (2014.12); *B60N 2002/0212* (2013.01); *B60N 2002/0288* (2013.01)

(58) Field of Classification Search
USPC ...... 297/284.9, 452.34, 452.36, 283.3, 283.4
See application file for complete search history.

(56) References Cited

U.S. PATENT DOCUMENTS

| | | | | |
|---|---|---|---|---|
| 4,496,189 | A * | 1/1985 | Tanizaki et al. ................ | 297/63 |
| 5,384,946 | A * | 1/1995 | Sundstedt et al. ............ | 297/238 |
| 5,669,665 | A * | 9/1997 | Nowak ........................ | 297/406 |
| 6,840,577 | B2 * | 1/2005 | Watkins ..................... | 297/284.9 |
| 7,341,302 | B2 * | 3/2008 | Slade ......................... | 296/65.01 |
| 7,980,617 | B2 * | 7/2011 | Brncick et al. ................. | 296/64 |
| 2005/0179300 | A1 * | 8/2005 | O'Connor et al. ........... | 297/391 |
| 2007/0052264 | A1 * | 3/2007 | Lee ........................... | 297/188.04 |
| 2009/0236885 | A1 * | 9/2009 | Maier et al. .................. | 297/257 |
| 2009/0250984 | A1 * | 10/2009 | Maier .......................... | 297/232 |
| 2009/0250985 | A1 * | 10/2009 | Maier .......................... | 297/257 |

* cited by examiner

*Primary Examiner* — David E Allred
(74) *Attorney, Agent, or Firm* — Kilpatrick Townsend & Stockton LLP; Dean W. Russell; Shin Tsen Chang

(57) ABSTRACT

The present invention generally relates to passenger aircraft seats. Some examples provide systems for providing side support to seated passengers. Some examples include a passenger seat backrest having an extendable side support. An extendable side support may be integrated with a seat backrest and may be moved between a stowed position and a deployed position. When in a deployed position, the expandable side support may then provide additional side support to a seated passenger's body.

19 Claims, 7 Drawing Sheets

SIDE SUPPORT FOR AN AIRCRAFT SEAT

CROSS REFERENCE TO RELATED APPLICATION

This application claims priority to and the benefit of U.S. Provisional Application No. 61/721,153 filed on Nov. 1, 2012, the contents of which are incorporated herein by reference.

BACKGROUND OF THE INVENTION

The present invention generally relates to aircraft passenger seats. More specifically, embodiments of the present invention relate to systems, methods, and apparatuses for providing side support on an aircraft passenger seat for a various range of seated aircraft passengers.

Passenger airplane seats typically only provide backrest to support a seated passenger's body, and thus all of the weight of the upper body will be transferred to neck and lower back muscles. During longer flights, a seated passenger may experience neck or lower back pain after being seated for long periods of time. Further, videotape studies have shown that sleeping adults change their body position an average of 11 to 13 times per night with the majority of sleep time spent lying on a side of the body. Similarly, airline passengers may tend to turn in their seats to rest on their sides in order to comfortably rest or sleep during long flights. However, the designs of current tourist and business class aircraft seats do not support a seated passenger's side with full surface contact when they want to turn and rest or sleep on their sides. Poor neck posture and support during resting or sleeping may be responsible for subsequent neck pain and stiffness, shoulder blade or arm pain, or even headaches. Turning to the side can often leave the passenger feeling even more uncomfortable and disgruntled about the flying experience.

In light of the above, it would be desirable to provide improved systems, methods and apparatuses for supporting a passenger's side while the passenger is seated in a seat. In particular, improvements can be made to provide for a more supportive passenger aircraft seat.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some aspects of the invention, a passenger seat is provided. The passenger seat may include a seat backrest cushion supported by a seat backrest assembly. The seat backrest cushion may include a side support coupled with the seat backrest assembly. The side support may be moveable between a fully deployed position and a stowed position. The side support may provide a side bearing surface for supporting a seated passenger adjacent to the seat backrest cushion that increases a bearing surface area on an upper half of the seat backrest cushion when the side support is in the fully deployed position. In some embodiments of the passenger seat, the side support may form part of a seat backrest bearing surface when in the stowed position. Optionally the side support may be rotatably coupled with the seat backrest assembly. Some embodiments have a side support rotatably coupled with the seat backrest using one or more one-way torque hinges. In some embodiments, the side support may be sideably coupled with the seat backrest assembly. The side support may be configured to translate along the seat backrest assembly so that the side support may change in height relative to the seat backrest cushion. Optionally, the side support may be selectively locked in a plurality of discrete positions between the stowed position and the fully deployed position.

In some embodiments, the side support has a first surface and a second surface opposite the first surface. The first surface of the side support may form part of the seat backrest bearing surface when the side support is in the stowed position and the second surface may form the side bearing surface when the side support is in the fully deployed position.

In some embodiments, the seat backrest cushion may include a second side support coupled with the seat backrest assembly. The second side support may be moveable between a fully deployed position and a stowed position and may provide a second side bearing surface adjacent to the seat backrest cushion that increases the bearing surface area on the upper half of the seat backrest cushion when the second side support is in the fully deployed position. Optionally, the second side support may be coupled with the seat backrest assembly on a side opposite from the other side support. In some embodiments, the second side support may deploy from the stowed position towards the fully deployed position in a direction different than a direction of deployment of the other side support. Optionally, the second side support may deploy from the stowed position towards the fully deployed position in the direction opposite from the direction of deployment of the other side support. In some embodiments, the second side support deploys from the stowed position towards the fully deployed position in a direction similar to a direction of deployment of the other side support.

In some embodiments, the passenger seat may include at least one armrest coupled with the seat backrest cushion. The at least one armrest may have a bearing surface defined by an inner edge and an outer edge separated by an armrest width. In some embodiments, the side bearing surface does not cross a vertical plane defined by the outer edge of the armrest when the side support is in the fully deployed position. In some embodiments, the side bearing surface does not cross a vertical plane defined by half the armrest width when the side support is in the fully deployed position.

In another aspect of the present invention, a passenger airplane seat is provided that includes a seat backrest cushion supported by a seat backrest assembly. The seat backrest assembly may have a first side and a second side opposite the first side. The passenger seat may also include a first and second armrest coupled with the seatback rest assembly on opposite sides. A first side support may couple with the seat backrest assembly on the first side and may be moveable between a deployed position and a stowed position. A second side support may be coupled with the seat backrest assembly on the second side and may be moveable between a deployed position and a stowed position. The first side support may provide a first side bearing surface adjacent to the seat backrest cushion that increases a bearing surface area of the seat backrest cushion when the first side support is in the deployed position. The second side support may provide a second side bearing surface adjacent to the seat backrest cushion that increases the bearing surface area of the seat backrest cushion when the second side support is in the deployed position. Optionally, the first side bearing surface and the second side bearing surface may be at an angle with a bearing surface of the seat backrest cushion when in the fully deployed positions, with the angle being between 90-130°. In some embodiments, the first side bearing surface and the second side bearing surface may increase a bearing surface area of the upper half of the airplane passenger seat.

In another aspect of the present invention, a passenger seat system is provided. The passenger seat system may include a first passenger seat and a second passenger seat. Each seat may include a seat backrest cushion supported by a seat backrest assembly. The seat backrest cushions may each include a side support coupled with their respective seat backrest assemblies. The side supports may be moveable between fully deployed positions and stowed positions and may provide side bearing surfaces adjacent to their respective seat backrest cushion that increases a bearing surface area of their respective seat backrest cushion when the side supports are in the fully deployed positions. The system may also include an armrest coupled between the first passenger seat and the second passenger seat. The first passenger seat and the second passenger seat may be separated by a gap having a gap width. In some embodiments, the first side support and the second side support may deploy into the gap between the first passenger seat and the second passenger seat. Preferably, the first side support and second side support deploy into the gap equally.

The invention will be better understood on reading the following description and examining the figures that accompany it. These figures are provided by way of illustration only and are in no way limiting on the invention.

DETAILED DESCRIPTION

Figure 1B:
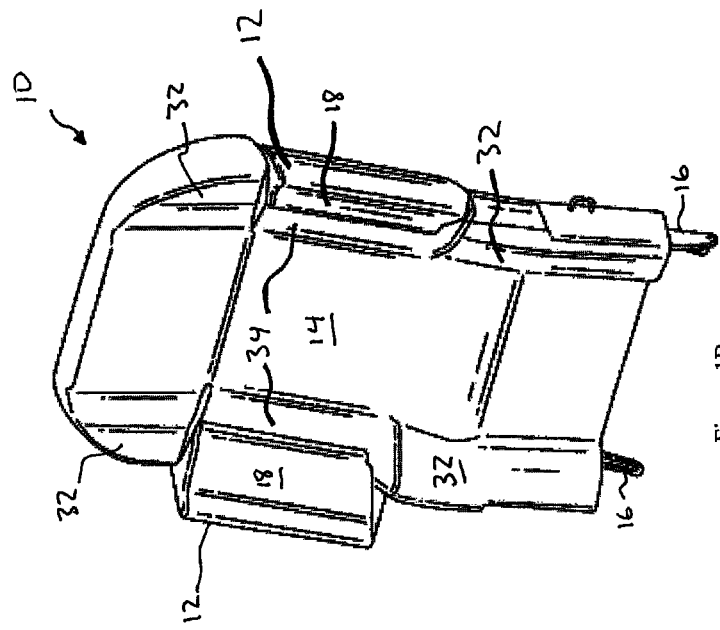
FIGS. 1A-1D illustrate exemplary embodiments of the present invention and the deployment of a side support according to some embodiments of the invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1A-1D illustrate exemplary embodiments of a passenger seat backrest 10 and the deployment of a side support 12 according to some embodiments of the invention. As illustrated, the passenger backrest 10 includes a bearing surface 14 for supporting a seated passenger. Passenger seat backrest 10 may include one or more side supports 12. Further, seat backrest 10 may be structurally supported by a backrest assembly or frame 16. The side supports 12 may be coupled with the backrest assembly 16. The side supports 12 may be moveable between a stowed position, illustrated in FIG. 1A, and a fully deployed position, illustrated in FIG. 1B. When in the deployed position, the side supports 12 may provide a side bearing surface area 18 for supporting a seated passenger's side. When in the stowed position, the side supports 12 may form a portion of the bearing surface 14 of the passenger seat backrest 10. Accordingly, in some embodiments, side supports 12 may deploy to increase the total bearing surface of a passenger seat using the exemplary seat backrest 10. In most embodiments, the side support increases a total bearing surface on an upper portion of seat backrest 10 when deployed.

Figure 1A:
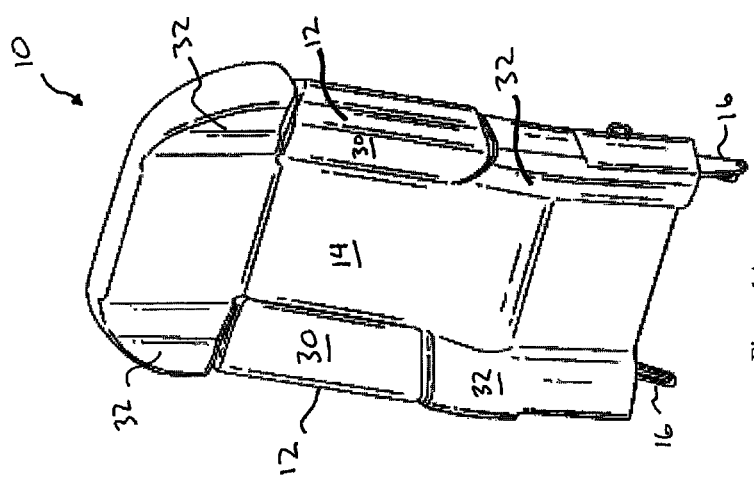
Figure 1C:
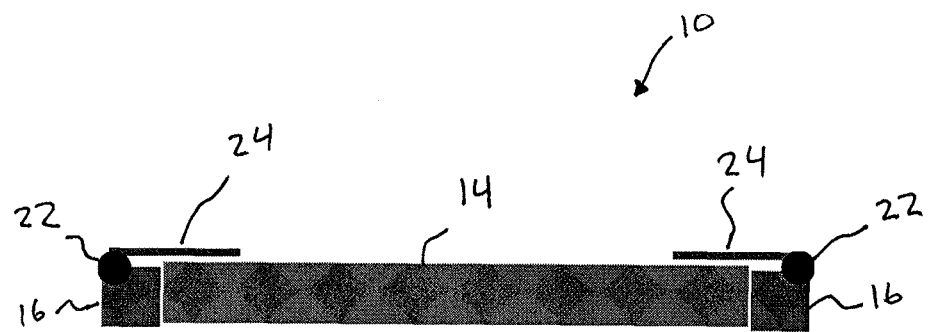
Figure 1D:
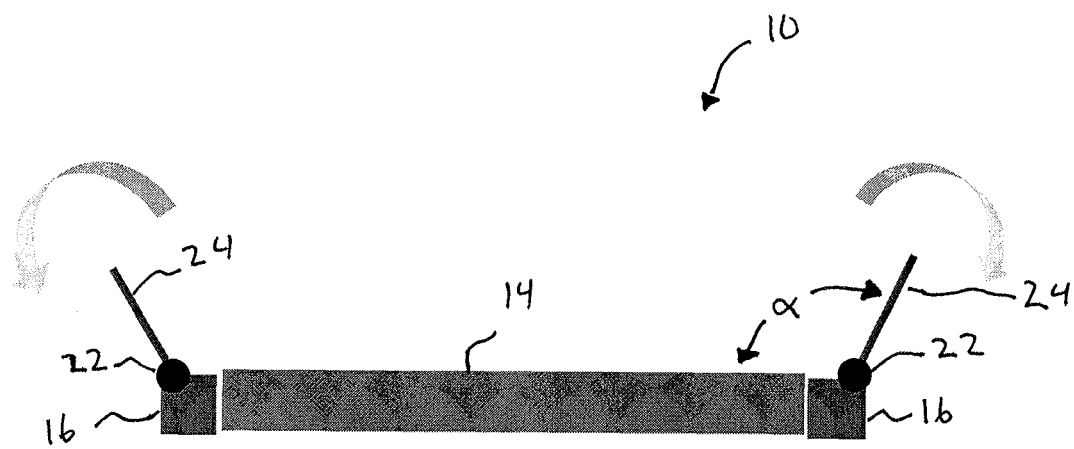
Figure 2A:
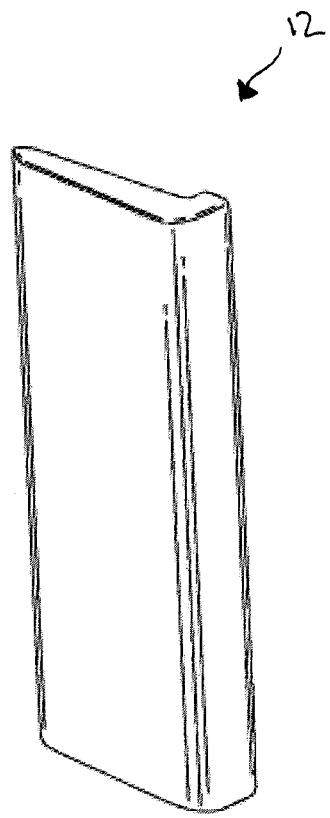
FIGS. 2A-2D illustrate further details of the exemplary side support shown in FIG. 1 according to some embodiments of the invention.
Figure 2B:
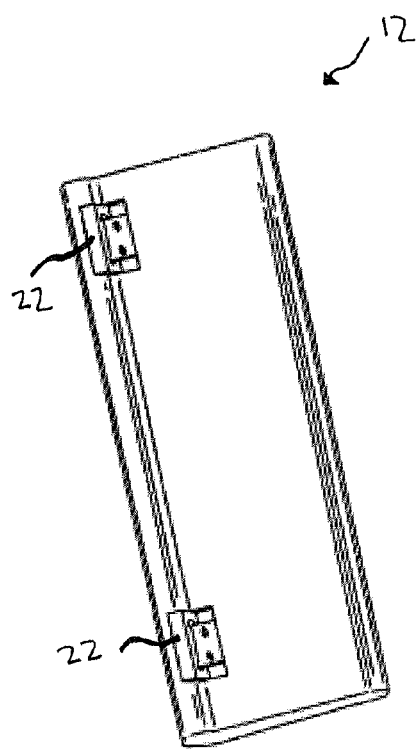
Figure 2C:
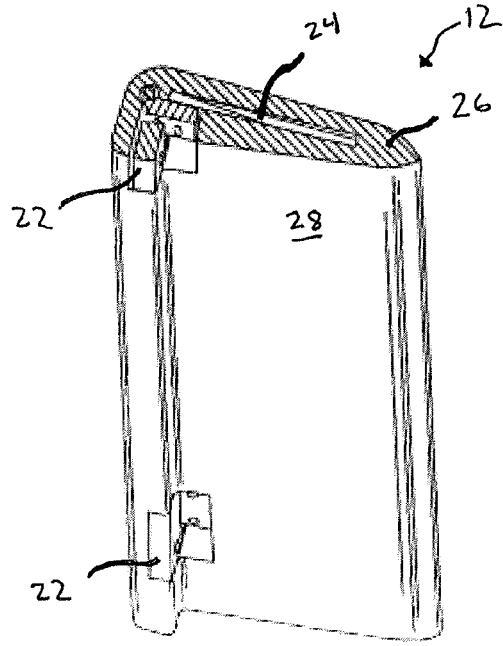
Figure 2D:
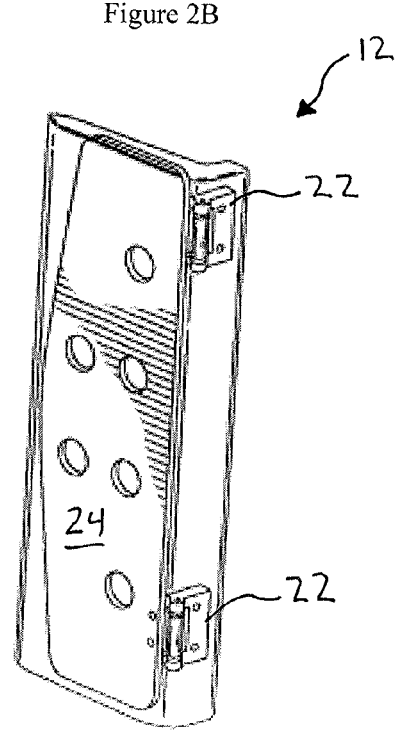

FIGS. 1C-1D illustrate simplified cross-sectional diagrams illustrating components of exemplary seat backrest 10 while the side support 12 is in a stowed position and a deployed position. As discussed above, seat backrest 10 may be supported on both sides by backrest assembly 16. Backrest assembly 16 may couple with hinges 22 for rotatably coupling side supports 12 to the backrest assembly 16. Side supports 12 may include frame 24 which may couple with hinge 22. As illustrated in FIG. 1C, frame 24 may be substantially flush with the seat backrest 10 while in the stowed position. FIG. 1D illustrates the position of frame 24 after being deployed from the stowed position to a deployed position. In the exemplary embodiment, frame 24 (and side support 12) may deploy at an angel $\alpha$ relative to seat backrest 10. In some embodiments, $\alpha$ may range from 90-180°, when the side supports 12/frame 24 are in a fully deployed position. Preferably, side supports 12/frame 24 are at an angle between 120-140° relative to the seat backrest 10 when fully deployed. In some embodiments, the sides supports 12 do not deploy at an angle greater than 130°.

While passenger seat backrest 10 was designed for used in passenger airplanes, it should be understood that passenger seat backrest 10 may be used in any vehicle where the advantages of such a design are desired. For example, the advantages of passenger seat backrest 10 may be desired in automobile seats or train seats. In particular, vans, buses or passenger trains may benefit from embodiments described herein. Further while, passenger seat backrest 10 has been described and illustrated with two side supports 12, other embodiments may include one, three, four, or more stowable and deployable side supports 12 for providing a side bearing surface area 18 for increasing the support of a side of a seated passenger.

In some embodiments, the side support 12 may be added to a conventional backrest cushion 10. The bearing surface 14 of backrest 10 may include raised contours 32 for helping keep passengers centered in the seat. Side support 12 may be similarly configured so as to be flush with backrest 10 when in the stowed position. In some embodiments backrest 10 may include a recess 34 for stowing side support 12 such that an outer surface 30 of side support 12 may be flush with a surface of backrest 10 when the side support 12 is in the stowed position. Accordingly, while in the stowed position, the outer surface 30 of side support 12 may form part of the bearing surface 14 of seat 10. In some embodiments surface 30 is opposite or adjacent to side bearing surface 18.

Further, while the exemplary embodiment in FIGS. 1A-1D illustrates side supports 12 being rotatably coupled with the backrest assembly 16, other contemplated embodiments may include side supports 12 that are slideably or translatably coupled with the backrest assembly 16. In such embodiments, the side supports 12 may, for example, sideably move between the stowed position and the fully deployed position. In some embodiments, the side supports 12 may slide along a rail or track. Moreover, while embodiments may be configured for manual deployment, other embodiments may utilize electric actuators for moving or controlling the movement of side supports 12 between the stowed and deployed positions.

FIGS. 2A-2D illustrate further details of the exemplary side support 12 shown in FIG. 1 according to some embodiments of the invention. Side support 12 may include a plurality of hinges 22 coupled with a frame 24. Frame 24 may help provide support to cushion 26 and cushion 26 may be covered by a dress cover 28.

While side support 12 is illustrated with two hinges 22, it should be understood that one, three, four, or more hinges 22 could be used. The hinges 22 may allow side support 12 to be adjusted infinitely between the stowed position and the fully deployed position. Accordingly, the side support 12 may accommodate a large variation in passengers so that each passenger may be able to find a comfortable resting or sleeping position for the body during travel. Some embodiments may use lockable hinges which may be selectively locked in a plurality of positions. In some embodiments, it may be advantageous to use one-way torque hinges for coupling side support 12 with backrest 10. Torque hinges may be used to resist deployment of side support 12 from the stowed position to the deployed position. Such a feature may help prevent unintentional deployment of the side support 12 during turbulence or in emergency situations.

Frame 24 may be manufactured from sheet metal, plastic, ceramic material, etc. In some embodiments, frame 24 may be manufactured from an injection molding process. Further, frame 24 may be manufactured with one or more apertures 36 for reducing material expenses during manufacturing. Optionally, cushion 26 may comprise a polyurethane foam. In some embodiments, the polyurethane foam may be pressure-sensitive. Dress cover 28 may comprise a stain resistant material, an antimicrobial, and/or a water-resistant material.

Figure 3B:
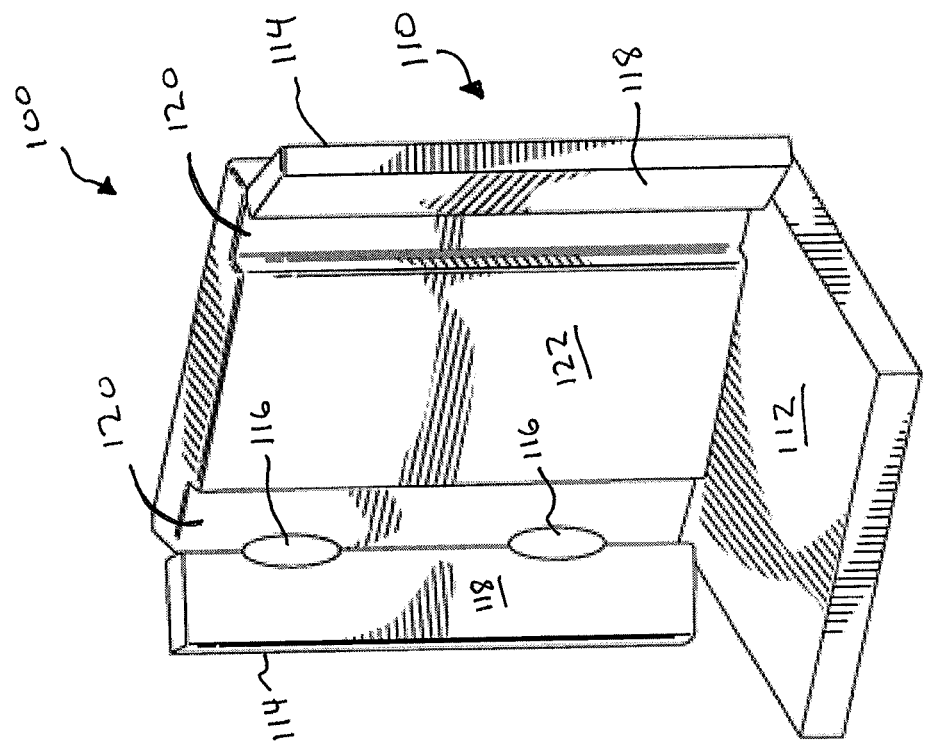
FIGS. 3A-3B illustrate an exemplary embodiment of a passenger seat where the side support mechanism can also be used as a headrest according to some embodiments of the invention.
Figure 3A:
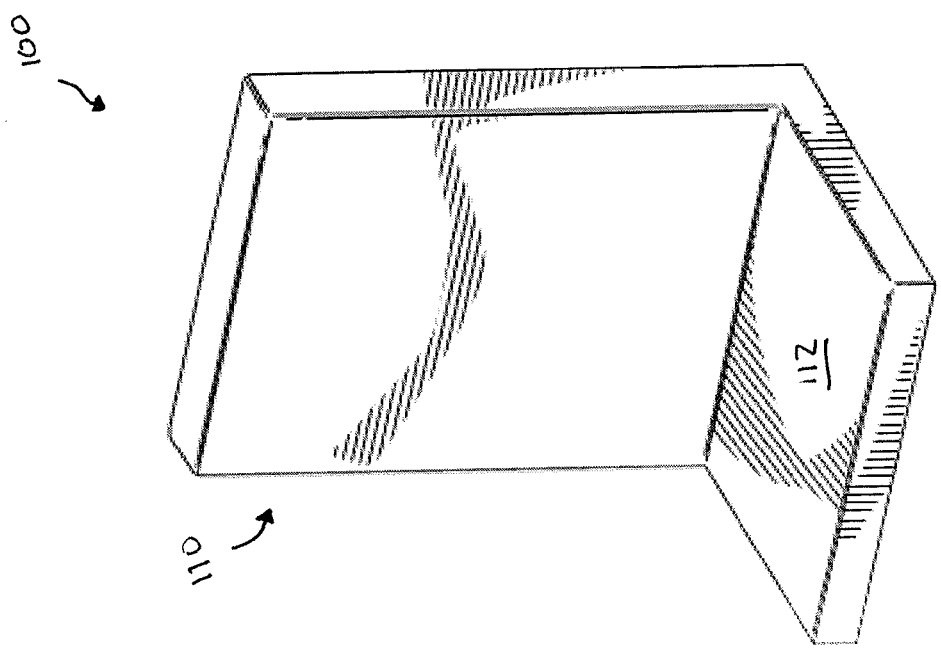

FIGS. 3A-3B illustrate certain exemplary embodiments of a passenger seat 100 where the side support mechanism can also be used as a headrest. FIG. 3A illustrates the passenger seat 100 when side supports 114 are in a stowed position, and FIG. 3B illustrates the passenger seat 100 when side supports 114 are in a deployed position. The passenger seat 100 may include a seat backrest 110 coupled with a seat base 112. Side supports 114 may be configured to rotate from the stowed position to the deployed position via hinges 116. Once deployed, the side supports 114 may provide a side bearing surface 118 along the entire height of seat backrest 110. In such embodiments, side bearing surface 118 may provide support for a seated passenger's side and head. Advantageously, side supports 114 provide additional area for head support since the side supports 114 deploy by rotating away from the center of backrest 110. Backrest 110 may include recesses 120 to receive side supports 114 in the stowed position such that stowed side supports 114 are flush with a surface 122 of backrest 110.

Figure 4B:
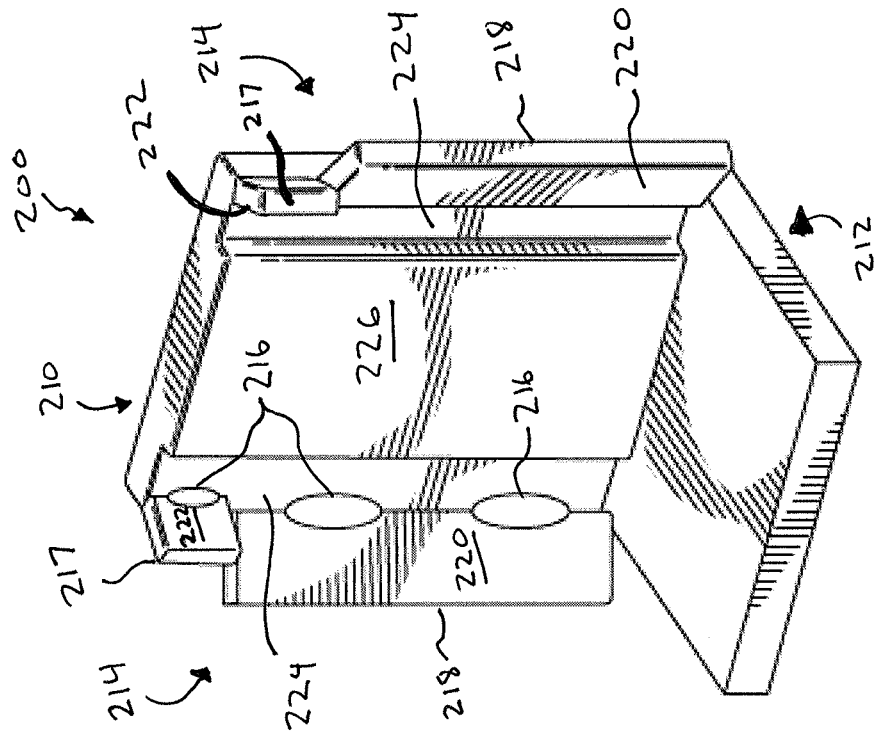
FIGS. 4A-4B illustrate another exemplary embodiment of a passenger seat where the side support mechanism can be divided into a plurality of separate portions according to some embodiments of the present invention.
Figure 4A:
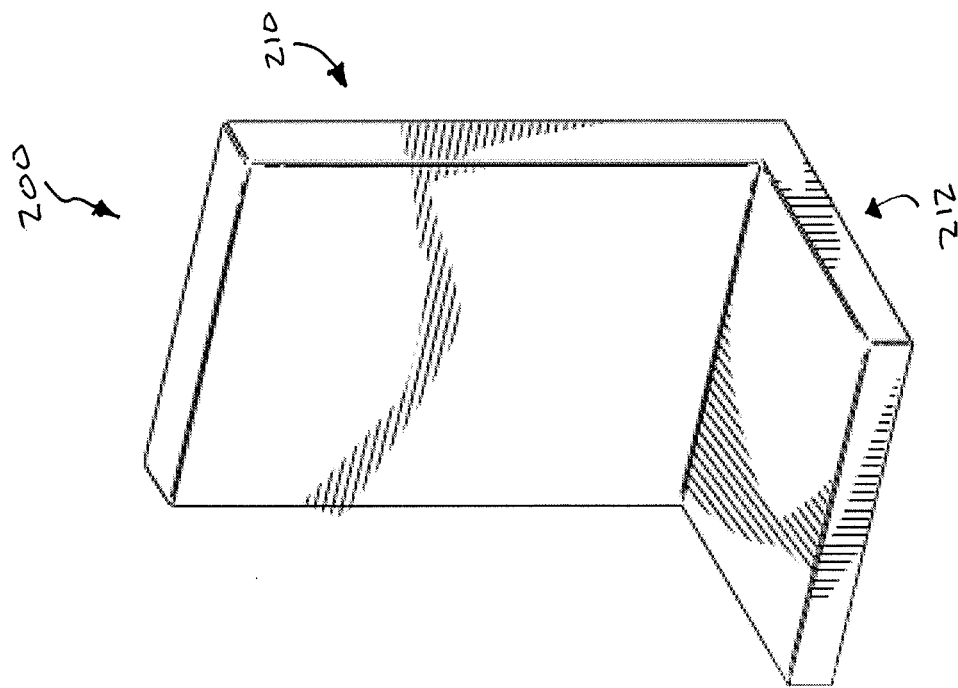

FIGS. 4A-4B illustrate other exemplary embodiments of a passenger seat 200. FIG. 4A illustrates the passenger seat 200 when side supports 214 are in a stowed position and FIG. 4B illustrates the passenger seat 200 when side supports 214 are in a deployed position. The passenger seat 200 may include a seat backrest 210 coupled with a seat base 212. Side supports 214 may be configured to rotate from the stowed position to the deployed position via hinges 216. Further, side supports 214 may be segmented into a plurality of portions. For example, side supports 214 may include a headrest portion 217 and a side rest portion 218, wherein each portion 217, 218 may move between the stowed and deployed positions independent of the other portion 217, 218. Once deployed, the side supports 214 may provide a lower side bearing surface 220 and/or an upper side bearing surface 222 adjacent to seat backrest 210. In such embodiments, lower side bearing surface 220 may provide support for a seated passenger's side, and upper side bearing surface 222 may provide support for a seated passenger's head. Backrest 210 may include recesses 224 to receive side supports 214 in the stowed position such that stowed side supports 214 are flush with a surface 226 of backrest 110.

The embodiments in FIGS. 3A-4B may be incorporated into seats that lack a headrest. Side supports 114, 214 may provide additional area for head support since the side supports 114, 214 deploy by rotating away from the center of backrest 110, 210. Moreover, while embodiments may be configured for manual deployment, other embodiments may utilize electronic actuators for moving or controlling the movement of side supports 114, 214 between the stowed and deployed positions. Similar to embodiments discussed above, side supports 114, 214 may be slideably or translatably coupled with backrest 110, 210, rather than rotatably coupled. In some embodiments, side supports may be rotatably coupled and slideably coupled relative to a seat backrest as illustrated in FIGS. 5A-5C.

Figures 5A, 5B, 5C:
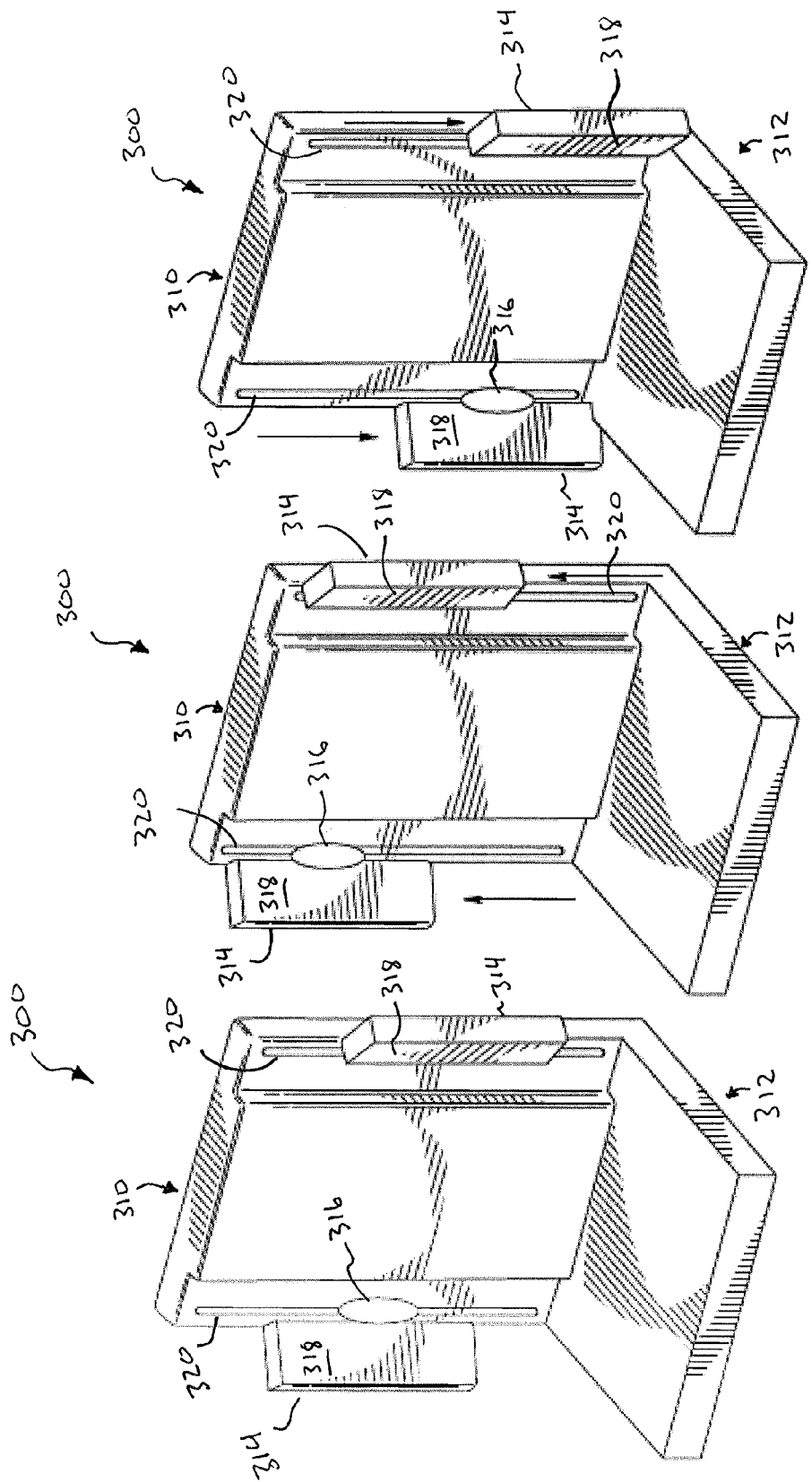
FIGS. 5A-5C illustrate another exemplary embodiment of side supports which may be rotatably coupled and sideably coupled relative to a seat backrest according to some embodiments of the present invention.

FIGS. 5A-5C illustrate an exemplary embodiment of a passenger seat 300 with a deployed side support 314, according to some embodiments of the present invention. Passenger seat 300 includes a backrest 310 coupled with a seat base 312. Seat backrest 310 includes side supports 314 which may deploy from a stowed position to a deployed position. In the exemplary embodiment, side supports 314 couple with backrest 310 via hinges 316. Once deployed, side supports 314 may provide a side bearing surface 318. Side supports 314 may also be slideably coupled with backrest 310. In the illustrated embodiments, side supports 314 may translate along rails 320 so that a height of side supports 314 may be adjusted. In some embodiments, side supports 314 may be coupled such that side supports 314 may be translated together. In alternative embodiments, side supports 314 may translate separately from one another. The side support 314 may support different passengers having different heights.

Figure 6A:
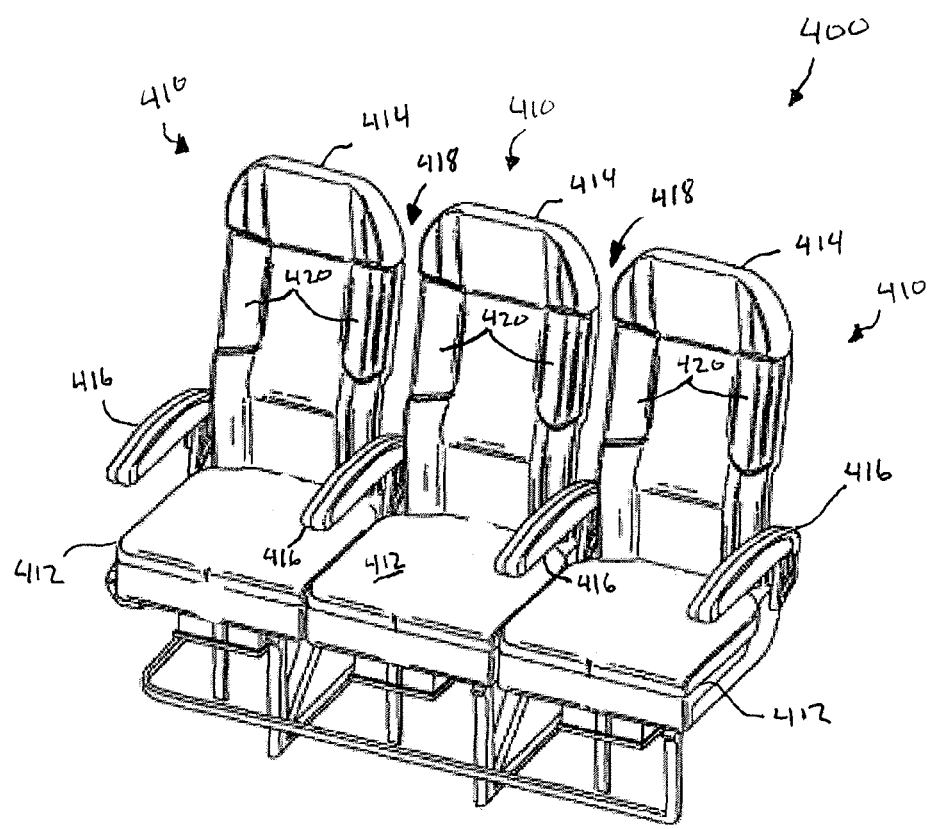
FIGS. 6A-6B illustrate a passenger seat system including a plurality of the passenger seat backrests depicted in FIGS. 1A-1B according to some embodiments of the present invention.
Figure 6B:
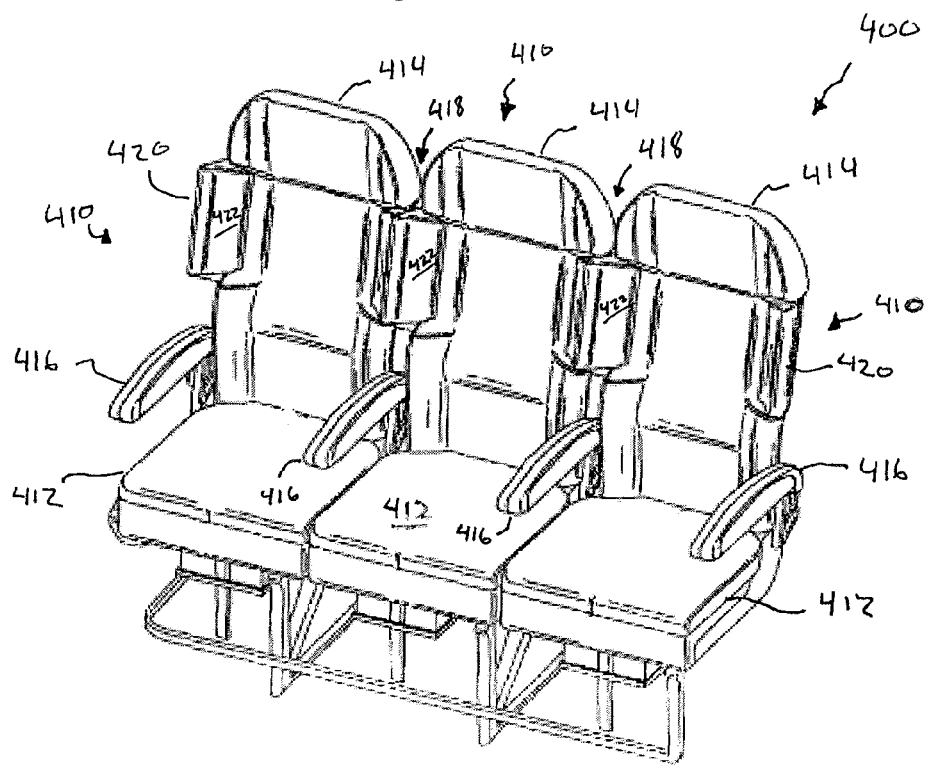

FIGS. 6A-6B illustrate a passenger seat system 400 including a plurality of the passenger seat backrests 10 shown in FIGS. 1A-1B. Passenger seat system 400 includes a plurality of passenger seats 410. Passenger seats 410 each include a passenger seat base 412 and a seat backrest 414. Passenger seat system 400 further includes passenger seat armrests 416 positioned on the sides of passenger seats 410. Further a gap 418 is formed between adjacent passenger seats 410. In some embodiments, a width of the gap 418 is defined by a width of the armrest 416. The seat backrests 414 include side supports 420 which may rotatably deploy from the stowed position, shown in FIG. 6A to a deployed position to provide additional side support 422, shown in FIG. 6B. In some embodiments, the side supports 420 may deploy into the gaps between seat backrests 414 or above an adjacent armrest 416. In most embodiments, it would be preferable if the side supports 420 do not deploy horizontally past an adjacent armrest so as to limit interference with an adjacent seat 410 and/or to avoid obstruction of an aisle or walkway adjacent to the passenger seat system 400. In some embodiments, the side supports 414 of adjacent seats may deploy into the gap equally so as to provide both seats 410 with an equal amount of side support 422.

While passenger seat system 400 is illustrated with three passenger seats, it should be understood that other exemplary embodiments may provide for a passenger seat system that includes one, two, four, five or more seats. Further while each seat 410 in passenger seat system 400 is illustrated with side supports 420, it should be understood that it is not essential for all passenger seats 410 of a passenger seat system 400 to include side supports 420. In some embodiments, a passenger seat system may be provided where not all passenger seats of a system include deployable side supports 420. Further while passenger seat system 400 is illustrated with the exemplary embodiments shown in FIGS. 1A-1B, it should be understood that the embodiments shown in FIGS. 3A-5C, may similarly be used in such passenger seat systems.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A passenger seat, comprising:
    a seat backrest cushion having a first backrest bearing surface, the seat backrest cushion being supported by a seat backrest frame internal to the seat backrest cushion;
    a first side support attached directly to the seat backrest frame, the first side support moveable from the seat backrest frame between a fully deployed position and a stowed position;
    a second side support attached directly to the seat backrest frame on a side opposite the first side support, the second side support moveable from the seat backrest frame between a fully deployed position and a stowed position;
    wherein, when the first side support is in the stowed position, the first side support provides a second backrest bearing surface bordering the first backrest bearing surface of the seat backrest cushion;
    wherein, when the second side support is in the stowed position, the second side support provides a third backrest bearing surface bordering the first backrest bearing surface of the seat backrest cushion, the third backrest bearing surface bordering a side of the first backrest bearing surface that is opposite the second backrest bearing surface so that the first backrest bearing surface of the seat backrest cushion is disposed between the third backrest bearing surface and the second backrest bearing surface;
    wherein the first side support provides a side bearing surface adjacent to the seat backrest cushion that increases a total bearing surface area on an upper half of the seat backrest cushion when the first side support is in the fully deployed position;
    wherein the second backrest bearing surface of the first side support is different from the side bearing surface of the first side support.

2. The passenger seat of claim 1, wherein the first side support is rotatably coupled with the seat backrest frame.

3. The passenger airplane seat of claim 2, wherein the second backrest surface of the first side support is opposite the side bearing surface of the first side support.

4. The passenger seat of claim 2, wherein the first side support is rotatably coupled with the seat backrest frame using a one-way torque hinge.

5. The passenger seat of claim 1, wherein the first side support is slideably attached to the seat backrest frame.

6. The passenger seat of claim 5, wherein the first side support has a first surface, the first surface of the first side support is flush with the first backrest bearing surface when the first side support is in the stowed position; and wherein the first surface forms the side bearing surface when the first side support is in the fully deployed position.

7. The passenger seat of claim 5, wherein the first side support is configured to couple with the seat backrest frame such that the first side support is translatable along the seat backrest frame for changing a height of the first side support and wherein the first side support is rotatably coupled with the seat backrest frame such that the first side support is configured to rotatably move between the stowed position and the deployed position.

8. The passenger seat of claim 1, wherein the first side support may be selectively locked in a plurality of discrete positions between the stowed position and the fully deployed position.

9. The passenger seat of claim 1, wherein the second side support provides a second side bearing surface adjacent to the seat backrest cushion that increases the bearing surface area on an upper half of the seat backrest cushion when the second side support is in the fully deployed position.

10. The passenger seat of claim 1, wherein the second side support deploys from the stowed position towards the fully deployed position in a direction different than a direction of deployment of the first side support.

11. The passenger seat of claim 10, wherein the second side support deploys from the stowed position towards the fully deployed position in the direction opposite from the direction of deployment of the first side support.

12. The passenger seat of claim 9, wherein the second side support deploys from the stowed position towards the fully deployed position in a direction similar to a direction of deployment of the first side support.

13. The passenger seat of claim 1, further comprising at least one armrest coupled with the seat backrest cushion, the at least one armrest having a bearing surface defined at least by an inner edge and an outer edge separated by an armrest width, and wherein the first side bearing surface does not cross a vertical plane defined by the outer edge of the armrest when the side support is in the fully deployed position.

14. The passenger seat of claim 13, wherein the side bearing surface does not cross a vertical plane defined by half the armrest width when the first side support is in the fully deployed position.

15. The passenger seat of claim 1, wherein the second backrest bearing surface is flush with the first backrest bearing surface of the seat backrest cushion when the first side support is in the stowed position; and wherein the third backrest bearing surface is flush with the first backrest bearing surface of the seat backrest cushion when the second side support is in the stowed position.

16. The passenger seat of claim 1, wherein the first backrest surface extends along a length of the seat backrest cushion.

17. A passenger airplane seat, comprising:
a seat backrest cushion, a front surface of the seat backrest cushion defining a backrest bearing surface, and the front surface having a first recessed area, and a second recessed area;
the seat backrest cushion being supported by a seat backrest frame internal to the seat backrest cushion, the seat backrest frame having a first side and a second side opposite the first side;
a first side support, separate from the backrest cushion, attached directly to the seat backrest frame on the first side, the first side support moveable between a deployed position and a stowed position where the first side support is stowed within the first recessed area of the front surface of the seat backrest cushion;
a second side support, separate from the seat backrest cushion, attached directly to the seat backrest frame on the second side, the second side support movable between a deployed position and a stowed position where the second side support is stowed within the second recessed area of the front surface of the seat backrest cushion;
wherein the first side support provides a first side bearing surface adjacent to the seat backrest cushion that increases a bearing surface area of the passenger airplane seat when the first side support is in the deployed position; and
wherein the second side support provides a second side bearing surface adjacent to the seat backrest cushion that increases the bearing surface area of the passenger airplane seat when the second side support is in the deployed position; and wherein the seat backrest cushion is disposed between the first side bearing surface and the second side bearing surface.

18. The passenger airplane seat of claim 17, wherein the first side bearing surface and the second side bearing surface are at an angle with the bearing surface of the seat backrest cushion when in a fully deployed position, the angle being between 120-140°.

19. The passenger airplane seat of claim 17, wherein the first side bearing surface and the second side bearing surface increase the bearing surface area of an upper half of the passenger seat.

* * * * *